United States Patent Office 3,460,890
Patented Aug. 12, 1969

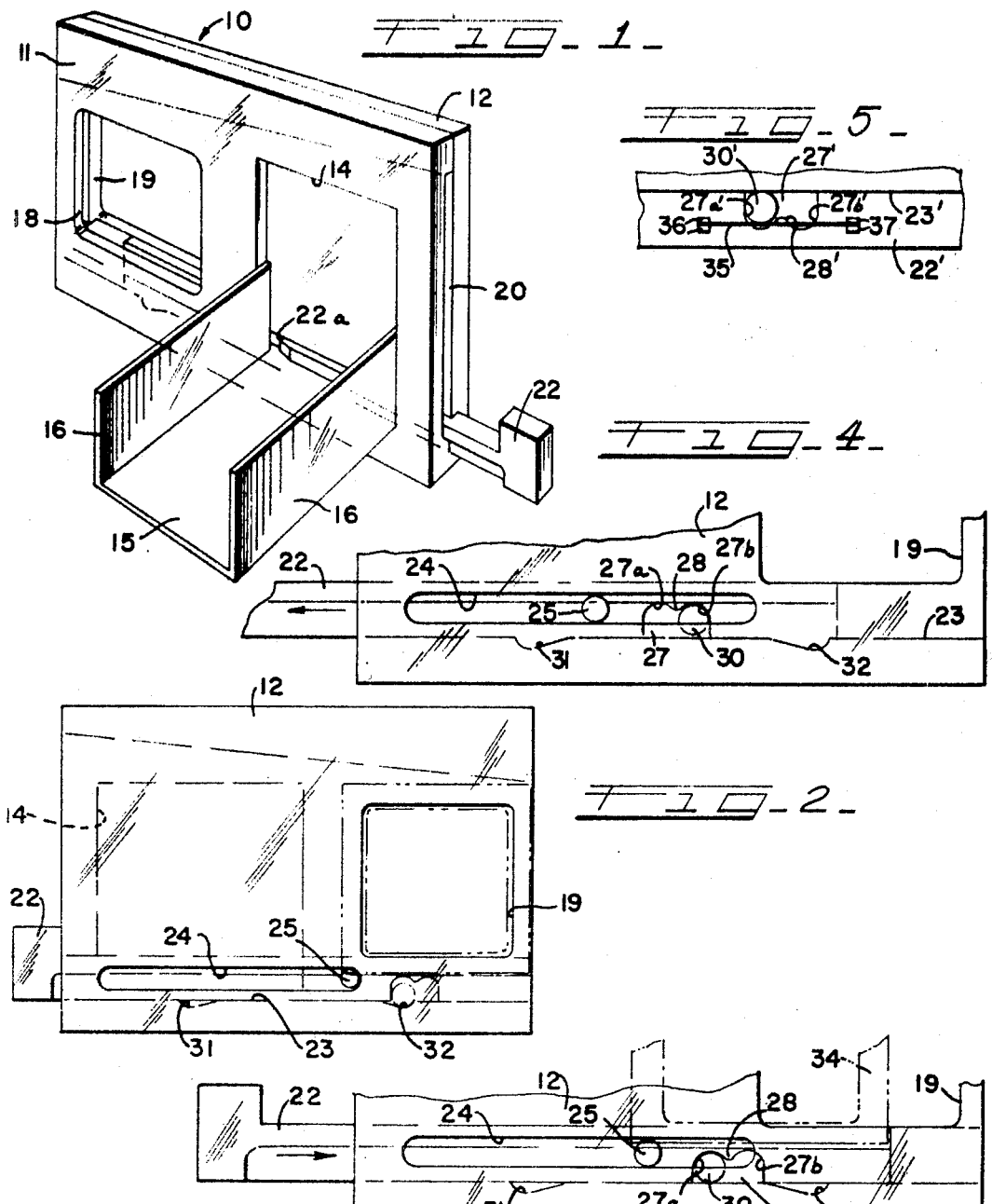

3,460,890
INTERLOCK MECHANISM FOR DEVICES SUCH AS SLIDE CHANGERS
Frank P. Bennett, Northbrook, Ill., assignor to GAF Corporation, a corporation of Delaware
Filed Apr. 20, 1967, Ser. No. 632,275
Int. Cl. G03b 23/14
U.S. Cl. 353—114                                    11 Claims

ABSTRACT OF THE DISCLOSURE

The support member of the slide changer includes an aperture through which images of slides may be projected or viewed. The support member also mounts a reciprocating slide changer slidable in opposite directions to move slides individually to and from registry with the aperture. The slide changer includes a generally U-shaped recess opening adjacent an elongated planar surface on the support member, which surface extends in parallel relation with the direction of slide changer movement and acts to support the latter for slidable movement. The recess has a central lobe defining a pair of pockets. A roller is alternately received in the pockets for rolling engagement with the aforementioned elongated surface. The configuration of the recess and its cooperation with the roller is such that after the slide changer is moved in either direction, from an initial position, attempted retrograde or return movement of the slide changer causes binding of the roller thereby preventing such return movement until the slide changer has completed its movement in the direction of initial movement. A pair of depressions in spaced relation in the aforementioned surface permit changing of the roller from one pocket to the other thereby to permit retrograde or return movement of the slide changer after it has completed its full stroke in either direction.

Background of the invention

In devices, such as slide changing devices, after movement of the slide changer has been initiated, it is desirable to prevent retrograde or reverse movement of the slide changer until the same has completed its full stroke. Such feature prevents the slide changer from selecting and advancing a succeeding slide from the supply magazine and onto the track leading to the projection aperture until the slide previously viewed or projected has been cleared from the viewing or projection position. The present invention provides this feature in a simple and unique manner, and is an improvement over the interlock shown in Horton Patent 3,196,565.

This invention has particular although not exclusive application with a slide changing device for photographic slides. Since the invention has that application and since the invention has been incorporated in a working slide changer model, the invention will be disclosed in the context and environment of a slide changing device. However, it will be understood that the invention is not to be so limited, as it obviously has applications in other devices, such as bending machines in association with the actuating levers thereof.

Objects of the invention

A primary object of the present invention is the provision of new and improved interlock means for preventing retrograde or return movement of one member relative to another member after the one member has been moved in one direction from an initial position and until it has completed its movement in that direction.

Another object of the present invention is the provision of new and improved interlock means of the type described including a recess uniquely cooperating with a roller for either rolling the latter along or binding the same against an elongated surface on the other member.

Still another object of the invention is the provision of an interlock mechanism of the type described which is extremely simple in design, inexpensive in manufacture, and durable, automatic and virtually foolproof in operation.

These and other objects and advantages of the invention will become apparent from the following specification disclosing a preferred embodiment illustrated in the accompanying drawings.

Description of the drawings

FIG. 1 is a perspective view of a simple slide changing device embodying the interlock mechanism of the present invention;

FIG. 2 is a rear elevational view of the slide changing device;

FIG. 3 is an enlarged fragmentary rear elevation showing the slide changer being advanced from left to right;

FIG. 4 is also a fragmentary rear elevation of the slide changer but showing the same being withdrawn from right to left; and FIG. 5 is a fragmentary rear elevation of a modified form of the interlock mechanism, with certain parts of the slide changer not being shown for purposes of better illustration of the invention.

The present invention may be associated with a slide changing device 10, which device is shown in its most basic and simple form in order to facilitate ready and complete understanding of the present invention. It will be understood that the slide changing device 10 may be incorporated in either slide viewers or slide projectors.

The slide changing device 10 is, by way of example, formed of plates and sections of clear plastic material and consists of a support member defined by a pair of rectangular plates 11 and 12 secured together by any suitable means. The plate 11 includes a rectangular opening 14 forming the mouth of a slide supply magazine consisting of a bottom plate 15 and side plates 16. It will be understood that such slide magazine is adapted to support a plurality of slides in face-to-face relation, i.e., stack form, for being advanced toward the opening 14. The slides can be advanced either by gravity or by suitable spring means (not shown).

Plates 11 and 12 include respective aligned apertures 18 and 19 defining the viewing or projection aperture therebetween. Plate 11 includes a longitudinally extending recess 20 forming a guideway for directing a slide from the opening 14 to a position between apertures 18 and 19.

Plates 11 and 12 include complementary, longitudinally extending recesses defining a slideway for supporting a slide changer 22 for reciprocal sliding movement relative to the support member defined by such plates. The recess in the plate 12 is formed in part by an elongated planar surface 23 which extends in parallel relation with the direction of slide changer movement and which slidably engages the undersurface of the latter. Plate 12 also includes an elongated slot 24 which receives a projection 25 on the slide changer thereby to limit the stroke of the latter.

As noted in FIG. 1, the slide changer includes a push-ing face or abutment 22a. This abutment engages the trailing edge of the foremost slide in the supply magazine for advancing the same to the projection aperture upon movement of the slide changer from right to left. The leading edge of the next slide being advanced will engage the trailing edge of the slide in the projection aperture for pushing the latter out of the support member through the guideway 20.

The slide changer 22 includes a recess 27 of generally inverted U-shape, which recess faces or opens adjacent the planar surface 23. Recess 27 has a central lobe 28 defining on respective opposite sides thereof a pair of pockets 27a and 27b. A roller or disk 30 is received alternately in the pockets of the recess 27 for rolling engagement along the surface 23. The roller 30 is captured within the recess 27 by being engaged on opposite sides by portions of the plates 11 and 12. It will be noted that the surface 23 includes a pair of depressions 31, 32 spaced along the length of the former.

When the slide changer 22 is fully withdrawn, the roller 30 will be contained within the space defined by the pocket 27b and the depression 31. As the slide changer 22 is inserted, i.e., moved from left to right as seen in FIG. 3, the projection 22a engages the trailing edge of a slide, such as the slide 34 illustrated in FIG. 3, and moves the same toward the space between the projection or viewing apertures 18 and 19. Upon initial inward movement of the slide changer, the roller 30 will be captured within the pocket 27a and rolled out of the depression 31 and onto the planar surface 23. As the slide changer 22 moves from left to right, the roller merely rolls along the surface 23. When the slide changer is fully inserted, the roller will be contained within the space defined by the depression 32 and the pocket 27a. Reverse movement of the slide changer 22, that is movement of the same from right to left, will result in the roller 30 being captured in the pocket 27b and rolled out of the depression 32 and along the surface 23 as viewed in FIG. 4. When the slide changer 22 is fully withdrawn, the roller 30 will again be received in the space defined by the depression 31 and the pocket 27b.

Referring to FIG. 3, it will be appreciated it is not possible to reverse or change the direction of movement of the slide changer 22 until the same has completed its movement to the right, i.e., moved to a position wherein the roller 30 drops in the depression 32. Should retrograde or reverse movement of the slide changer 22 be attempted prior to the latter fully completing its stroke, the lobe 28 will bind or wedge against the roller 30 (in the pocket 27a) binding the roller against the surface 23 and preventing retrograde or reverse movement of the slide changer.

Retrograde or reverse movement of the slide changer is also prevented during return movement of the latter, i.e., movement of the same from right to left as seen in FIG. 4. Referring to this figure, should it be attempted to reverse movement of the slide changer 22 roller 30 will become wedged in the pocket 27b between the lobe 28 and the surface 23 thereby preventing such retrograde movement.

It should be apparent that it is possible to reverse the planar surface 23 (including the depressions 31, 32) and the recess 27 with respect to the support member and slide changer. In other words, the recess 27 could be formed in either or both of the plates 11 and 12, and the planar surface 23 and depressions 31, 32 formed in the slide changer.

FIG. 5 shows a modification wherein the recess is still provided in the movable slide changer, but wherein such recess opens upwardly and is disposed beneath the elongated planar surface. The various parts in FIG. 5 which correspond to the embodiment illustrated above are indicated by the prime form of numeral.

It will be observed that in the FIGS. 1 through 4 embodiment, the force of gravity acts to maintain the roller 30 in rolling engagement with the surface 23. In the FIG. 5 embodiment, the roller 30′ has a thickness somewhat greater than the thickness of the slide changer 22′ and accordingly one end of the former projects from the latter and is engaged by a spring wire 35 which maintains the roller 30′ in rolling engagement with the planar surface 23′. Opposite ends of the spring wire 35 may be received in slots defined by pairs of tabs 36 and 37 formed on the slide changer 22′. It will be appreciated that the operation of the interlock mechanism according to FIG. 5 is the same as that described above in connection with the FIGS. 1 through 4 embodiment.

In the two embodiments just described, either the force of gravity or the spring 35 serves constantly to urge the roller against the cooperating planar surface. However, the roller need not be constantly urged toward this surface; it is only necessary that the roller be restrained in some way to cause relative movement between the latter and the recess thereby to permit the lobe 28 or 28′ to wedge the roller against the planar surface. For example, the roller could be provided with resilient end portions in sliding engagement with the walls adjacent the planar surface 23, 23′ thereby to restrain movement of the roller upon a change in the direction of movement of the slide changer in which case the lobe will then cam the roller against the planar surface for establishing the interlock.

It should be apparent that the present invention provides a simple and unique interlock mechanism for preventing retrograde movement or a change in the direction of movement of one member relative to another after initial movement of the former in one direction and until such member has completed its movement in that direction. The interlock mechanism is inexpensive to construct and is virtually foolproof in operation.

While the invention has been shown in but only two forms, it will be obvious to those skilled in the art it is not to be so limited. On the contrary, the invention is susceptible of various modifications and forms without departing from the spirit and scope of the appended claims. In this invention, it will also be understood the invention is not to be limited for use with slide changing devices, as obviously the invention has applicability to many other devices, for example, the operation of actuating levers of vending machines.

I claim:

1. In a slide changing device having a support member including an aperture through which images of slides may be projected, a reciprocating slide changer member slidably carried by said support member and movable in opposite directions to move slides individually to and from registry with said aperture, the improvement comprising, one of said members having an elongated, planar surface extending in parallel relation with the direction of slide changer movement, a roller and a recess on the other member receiving the roller, said roller being under the influence of means for causing relative movement between the former and said recess upon a change in the direction of movement of the slide changer, said recess being configured for cooperating with said roller to cause rolling of the latter along said surface when the slide changer is moved from a first position to a second position and vice versa and to cause binding of the roller with said surface upon retrograde movement of the slide changer at any point between said positions, and other means on said one member adjacent said surface thereof to permit retrograde movement of the slide changer only when the same is in said first or second positions.

2. In a slide changing device having a support member including an aperture through which images of slides may be projected, a reciprocating slide changer member slidably carried by said support member and movable in opposite directions to move slides individually to and from registry with said aperture, the improvement comprising, one of said members having an elongated, planar surface extending in parallel relation with the direction of slide changer movement, the other of said members having a recess opening adjacent said surface, said recess having a central lobe defining a pair of pockets on respective opposite sides thereof, a roller carried in said recess for rolling engagement with said surface, the distance between said lobe and said surface being substantially less than the diameter of said roller, which roller is under the influence of means for causing relative movement between the former and said recess upon a change in the direction of movement of the slide changer, said surface having a pair of depressions adjacent respective opposite ends thereof, whereby said roller rolls in one of said pockets during movement of said slide changer in one direction and becomes wedged between said lobe and said surface upon movement of the slide changer in the opposite direction prior to the roller reaching one of said depressions, and whereby said roller rolls in the other of said pockets during movement of said slide changer in said one direction prior to the roller reaching the other of said depressions, each of said depressions permitting changing of the roller from one pocket to the other and vice versa.

3. The improvement according to claim 2 further defined by, said recess being of generally U-shape with said lobe being disposed at the midpoint of the bight portion of the former, and biasing means holding said roller in engagement with said surface.

4. The improvement according to claim 2 wherein said recess is of generally inverted U-shape with said lobe being disposed at the midpoint of the bight portion of the former, and wherein gravity serves as the means holding said roller in engagement with said surface.

5. In combination with first and second members movable relative to each other between first and second positions and vice versa, the improvement for preventing retrograde movement of either member relative to the other at any point between said first and second positions comprising, one of said members having an elongated surface extending in parallel relation with the direction of relative movement between said members, a roller and a recess on the other member receiving the roller, said roller being under the influence of means for causing relative movement between the former and said recess upon a change in the direction of relative movement between said members, said recess being configured for cooperating with said roller to cause rolling of the latter along said surface when either of said members is moved from a first position to a second position relative to the other and vice versa and to cause binding of the roller with said surface upon retrograde movement of either of said members relative to the other at any point between said positions, and other means on said one member adjacent said surface thereof to permit retrograde movement of either member relative to the other only when the member is in said first or second positions.

6. In combination with first and second members movable relative to each other between first and second positions and vice versa, the improvement for preventing retrograde movement of either member relative to the other at any point between said first and second positions comprising, one of said members having an elongated surface extending in parallel relation with the direction of relative movement between said members, the other of said members having a recess opening adjacent said surface, said recess having a central lobe defining a pair of pockets on respective opposite sides thereof, a roller carried in said recess for rolling engagement with said surface, the distance between said lobe and said surface being substantially less than the diameter of said roller, which roller is under the influence of means for causing relative movement between the former and said recess upon a change in the direction of relative movement between said members, said surface having a pair of depressions in spaced relation along the length thereof, whereby said roller rolls in one of said pockets during movement of one of said members in one direction relative to the other and becomes wedged between said lobe and said surface upon movement of said one member in an opposite direction prior to the roller reaching one of said depressions, and whereby said roller rolls in the other of said pockets during movement of said one member in the opposite direction and becomes wedged between said lobe and said surface upon movement of said one member in said one direction prior to the roller reaching the other of said depressions, each of said depressions permitting changing of the roller from one pocket to the other and vice versa.

7. The improvement according to claim 6 further defined by, said recess being generally U-shaped with said lobe being disposed at the midpoint of the bight portion of the former, and biasing means holding said roller in engagement with said surface.

8. The improvement according to claim 6 wherein said recesses are of generally inverted U-shape with said lobe being disposed at the midpoint of the bight portion of the former, and whereby gravity serves as the means holding said roller in engagement with said surface.

9. In combination with first and second members wherein the former is mounted for oscillating movement relative to the latter, the improvement for preventing changing the direction of movement of said first member after it has started to move in one direction and until it has completed its movement in that direction comprising, one of said members having an elongated surface extending in parallel relation with the direction of movement of said first member, a roller and a recess on the other member receiving said roller, said roller being under the influence of means for causing relative movement between the former and said recess upon a change in the direction of relative movement between said members, said recess being configured for cooperating with said roller to cause rolling of the latter along said surface when said first member is moved in said one direction and to cause binding of the roller with said surface upon changing the direction of movement of said first member, and other means adjacent said surface for receiving said roller thereby to permit a change in the direction of movement of said first member after it has completed its movement in said one direction.

10. The improvement according to claim 9 wherein said first mentioned means includes a U-shaped recess in said other member, which recess is shaped to form a central lobe defining two pockets for alternately receiving said roller, the distance between said lobe and said surface being substantially less than the diameter of said roller.

11. The improvement according to claim 9 wherein said first and second members are constituted respectively by a reciprocating slide changer and a support member therefor, the slide changer and support member together constituting a slide changing device.

References Cited
UNITED STATES PATENTS
3,196,565    7/1965    Horton _____ 353—113

NORTON ANSHER, Primary Examiner

ROBERT P. GREINER, Assistant Examiner

U.S. Cl. X.R.

40—79